(12) United States Patent
Kikuchi et al.

(10) Patent No.: US 11,849,094 B2
(45) Date of Patent: Dec. 19, 2023

(54) IMAGE FORMING APPARATUS CAPABLE OF FORMING IMAGE ON SHEET WITH UNEVEN SURFACE, IMAGE FORMING CONDITION ADJUSTMENT METHOD

(71) Applicant: KYOCERA Document Solutions Inc., Osaka (JP)

(72) Inventors: Kanako Kikuchi, Osaka (JP); Akihiro Kondo, Osaka (JP); Keisuke Oba, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/057,456

(22) Filed: Nov. 21, 2022

(65) Prior Publication Data
US 2023/0164284 A1 May 25, 2023

(30) Foreign Application Priority Data

Nov. 24, 2021 (JP) .................. 2021-189948
Nov. 24, 2021 (JP) .................. 2021-189949

(51) Int. Cl.
*H04N 1/60* (2006.01)
*H04N 1/407* (2006.01)
*G03G 15/28* (2006.01)

(52) U.S. Cl.
CPC ........... *H04N 1/6027* (2013.01); *G03G 15/28* (2013.01); *H04N 1/4074* (2013.01); *H04N 1/6019* (2013.01)

(58) Field of Classification Search
None
See application file for complete search history.

(56) References Cited

U.S. PATENT DOCUMENTS 7,633,645 B2 * 12/2009 Yamazaki ................ H04N 1/60
358/1.9

FOREIGN PATENT DOCUMENTS

JP 2020177161 A 10/2020

* cited by examiner

*Primary Examiner* — Barbara D Reinier
(74) *Attorney, Agent, or Firm* — Alleman Hall Creasman & Tuttle LLP

(57) ABSTRACT

An image forming apparatus includes an image forming portion, a first acquisition processing portion, a second acquisition processing portion, and an adjustment processing portion. The image forming portion forms an image on a sheet. The first acquisition processing portion acquires a captured image of the sheet. The second acquisition processing portion acquires a specific value that indicates a difference between a gradation value of a pixel that, among pixels included in the captured image acquired by the first acquisition processing portion, corresponds to a higher part of an outer surface of the sheet, and a gradation value of a pixel that, among the pixels included in the captured image, corresponds to a lower part that is lower than the higher part. The adjustment processing portion adjusts an image forming condition of the image forming portion based on the specific value acquired by the second acquisition processing portion.

6 Claims, 10 Drawing Sheets

| UNEVENNESS DEPTH LEVEL | ADJUSTMENT AMOUNT OF NIP PRESSURE AT SECONDARY TRANSFER POSITION P1 |
|---|---|
| LEVEL 1 | ±0 |
| LEVEL 2 | +5 N |
| LEVEL 3 | +10 N |
| LEVEL 4 | +15 N |
| LEVEL 5 | +20 N |
| LEVEL 6 | +25 N |

| UNEVENNESS DEPTH LEVEL | ADJUSTMENT AMOUNT OF SECONDARY TRANSFER CURRENT |
|---|---|
| LEVEL 1 | ±0 |
| LEVEL 2 | +10 $\mu$A |
| LEVEL 3 | +20 $\mu$A |
| LEVEL 4 | +30 $\mu$A |
| LEVEL 5 | +40 $\mu$A |
| LEVEL 6 | +50 $\mu$A |

| UNEVENNESS DEPTH LEVEL | ADJUSTMENT AMOUNT OF FIXING TEMPERATURE |
|---|---|
| LEVEL 1 | ± 0° |
| LEVEL 2 | + 2.5° |
| LEVEL 3 | + 5.0° |
| LEVEL 4 | + 7.5° |
| LEVEL 5 | + 10.0° |
| LEVEL 6 | + 12.5° |

| UNEVENNESS DEPTH LEVEL | ADJUSTMENT AMOUNT OF NIP PRESSURE AT FIXING NIP PORTION P2 |
|---|---|
| LEVEL 1 | ± 0 |
| LEVEL 2 | + 5 N |
| LEVEL 3 | + 10 N |
| LEVEL 4 | + 15 N |
| LEVEL 5 | + 20 N |
| LEVEL 6 | + 25 N |

| UNEVENNESS DEPTH LEVEL | ADJUSTMENT AMOUNT OF ROTATION SPEED OF FIXING ROLLER 28A |
|---|---|
| LEVEL 1 | ±0% |
| LEVEL 2 | −10% |
| LEVEL 3 | −20% |
| LEVEL 4 | −30% |
| LEVEL 5 | −40% |
| LEVEL 6 | −50% |

TD15

IMAGE FORMING APPARATUS CAPABLE OF FORMING IMAGE ON SHEET WITH UNEVEN SURFACE, IMAGE FORMING CONDITION ADJUSTMENT METHOD

INCORPORATION BY REFERENCE

This application is based upon and claims the benefit of priority from the corresponding Japanese Patent Application No. 2021-189948 filed on Nov. 24, 2021 and Japanese Patent Application No. 2021-189949 filed on Nov. 24, 2021, the entire contents of which are incorporated herein by reference.

BACKGROUND

The present disclosure relates to an image forming apparatus and an image forming condition adjustment method.

In an image forming apparatus of an electrophotographic method, an image may be formed on a sheet with an uneven surface such as a sheet of embossed paper. Toner is hardly adhered to a lower part of the uneven surface of the sheet. As a result, in the image forming apparatus, when an image is formed on a sheet with an uneven surface, an image forming condition, such as a transfer current that is supplied to a transfer portion that transfers a toner image to the sheet, is adjusted for the purpose of restricting the degradation of the formed image.

In addition, there is known, as a related technology, an image forming apparatus that adjusts the image forming condition based on the detection result of the sheet surface shape. In this image forming apparatus, the image forming condition is adjusted based on a variation width of a voltage that is applied to a transfer portion connected to a constant current power supply, when a sheet passes through a position where a toner image is transferred to the sheet by the transfer portion.

SUMMARY

An image forming apparatus according to an aspect of the present disclosure includes an image forming portion, a first acquisition processing portion, a second acquisition processing portion, and an adjustment processing portion. The image forming portion forms an image on a sheet. The first acquisition processing portion acquires a captured image of the sheet. The second acquisition processing portion acquires a specific value that indicates a difference between a gradation value of a pixel that, among pixels included in the captured image acquired by the first acquisition processing portion, corresponds to a higher part of an outer surface of the sheet, and a gradation value of a pixel that, among the pixels included in the captured image, corresponds to a lower part that is lower than the higher part. The adjustment processing portion adjusts an image forming condition of the image forming portion based on the specific value acquired by the second acquisition processing portion.

An image forming condition adjustment method according to another aspect of the present disclosure is executed in an image forming apparatus including an image forming portion that forms an image on a sheet, and includes a first acquisition step, a second acquisition step, and an adjustment step. In the first acquisition step, a captured image of the sheet is acquired. In the second acquisition step, a specific value is acquired, wherein the specific value indicates a difference between a gradation value of a pixel that, among pixels included in the captured image acquired in the first acquisition step, corresponds to a higher part of an outer surface of the sheet, and a gradation value of a pixel that, among the pixels included in the captured image, corresponds to a lower part that is lower than the higher part. In the adjustment step, an image forming condition of the image forming portion is adjusted based on the specific value acquired in the second acquisition step.

An image forming apparatus according to a further aspect of the present disclosure includes an image forming portion, a transfer processing portion, a first acquisition processing portion, a detection processing portion, a second acquisition processing portion, and an adjustment processing portion. The image forming portion forms an image on a sheet using toners of colors C, M, and Y. The transfer processing portion transfers, to the sheet, a specific toner image that includes a first toner layer of a first color formed on an image-carrying member and a second toner layer of a second color formed on the first toner layer, the first color being any one of the colors C, M, and Y, the second color being any one of the colors C, M, and Y and being different from the first color. The first acquisition processing portion acquires a captured image of the sheet. The detection processing portion detects a specific image that corresponds to the specific toner image included in the captured image acquired by the first acquisition processing portion. The second acquisition processing portion acquires a skewness of a histogram of gradation values of a color mixture of the second color and a third color in the pixels included in the specific image detected by the detection processing portion, the third color being a color different from the first color and the second color among the colors C, M, and Y. The adjustment processing portion adjusts the image forming condition of the image forming portion based on the skewness acquired by the second acquisition processing portion.

An image forming condition adjustment method according to a still further aspect of the present disclosure is executed in an image forming apparatus including an image forming portion that forms an image on a sheet using toners of colors C, M, and Y, and includes a transfer step, a first acquisition step, a detection step, a second acquisition step, and an adjustment step. In the transfer step, a specific toner image is transferred to the sheet, wherein the specific toner image includes a first toner layer of a first color formed on an image-carrying member and a second toner layer of a second color formed on the first toner layer, the first color being any one of the colors C, M, and Y, the second color being any one of the colors C, M, and Y and being different from the first color. In the first acquisition step, a captured image of the sheet is acquired. In the detection step, a specific image is detected, wherein the specific image corresponds to the specific toner image included in the captured image acquired in the first acquisition step. In the second acquisition step, a skewness of a histogram of gradation values of a color mixture of the second color and a third color in the pixels included in the specific image detected in the detection step, is acquired, the third color being a color different from the first color and the second color among the colors C, M, and Y. In the adjustment step, the image forming condition of the image forming portion is adjusted based on the skewness acquired in the second acquisition step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used

BRIEF DESCRIPTION OF THE DRAWINGS

FIG. 6 is a diagram showing an example of first table data used to adjust an image forming condition in the image forming apparatus according to the first embodiment of the present disclosure.

FIG. 7 is a diagram showing an example of second table data used to adjust an image forming condition in the image forming apparatus according to the first embodiment of the present disclosure.

FIG. 8 is a diagram showing an example of third table data used to adjust an image forming condition in the image forming apparatus according to the first embodiment of the present disclosure.

FIG. 9 is a diagram showing an example of fourth table data used to adjust an image forming condition in the image forming apparatus according to the first embodiment of the present disclosure.

DETAILED DESCRIPTION

The following describes embodiments of the present disclosure with reference to the accompanying drawings. It should be noted that the following embodiments are examples of specific embodiments of the present disclosure and should not limit the technical scope of the present disclosure.

First Embodiment

Figure 1:
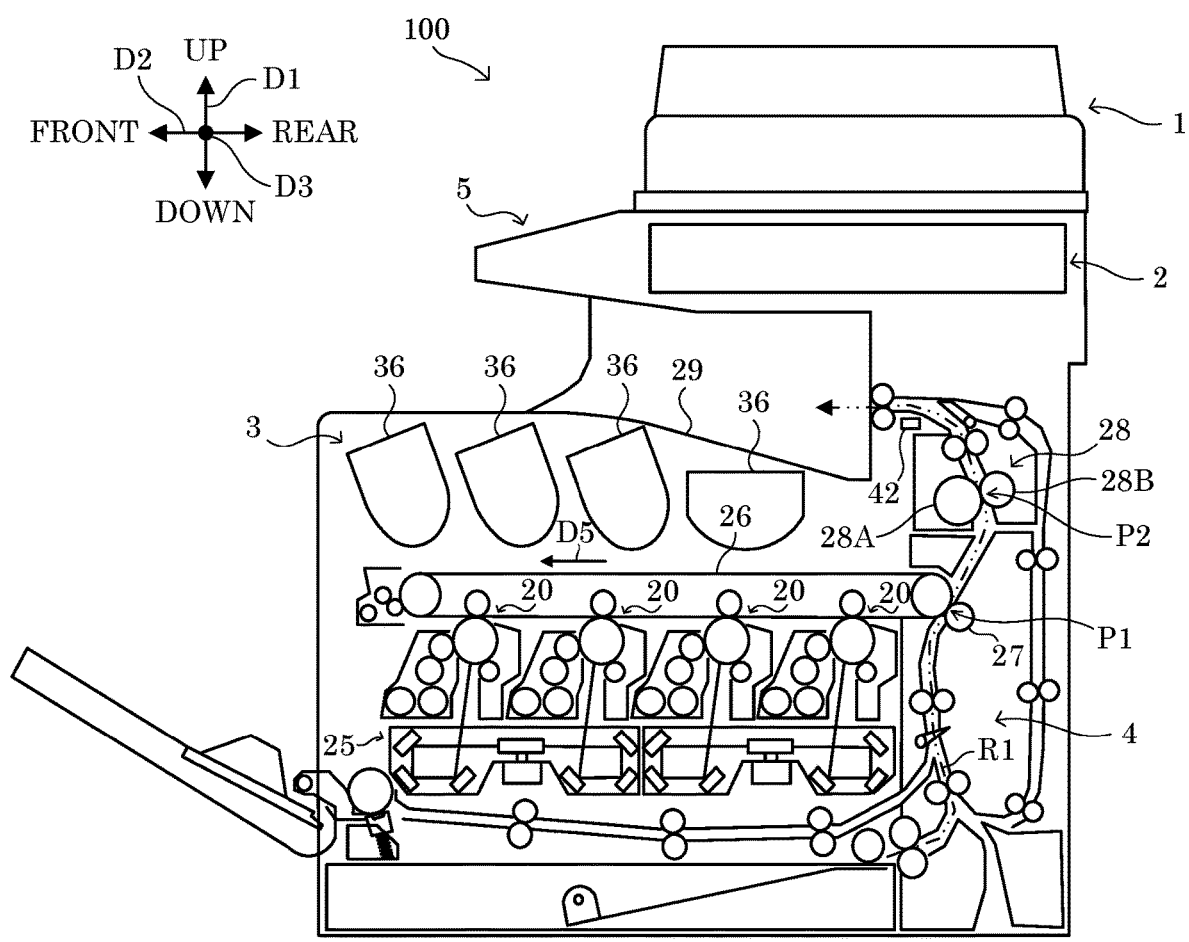
FIG. 1 is a cross-section diagram showing a configuration of an image forming apparatus according to a first embodiment of the present disclosure.
Figure 2:
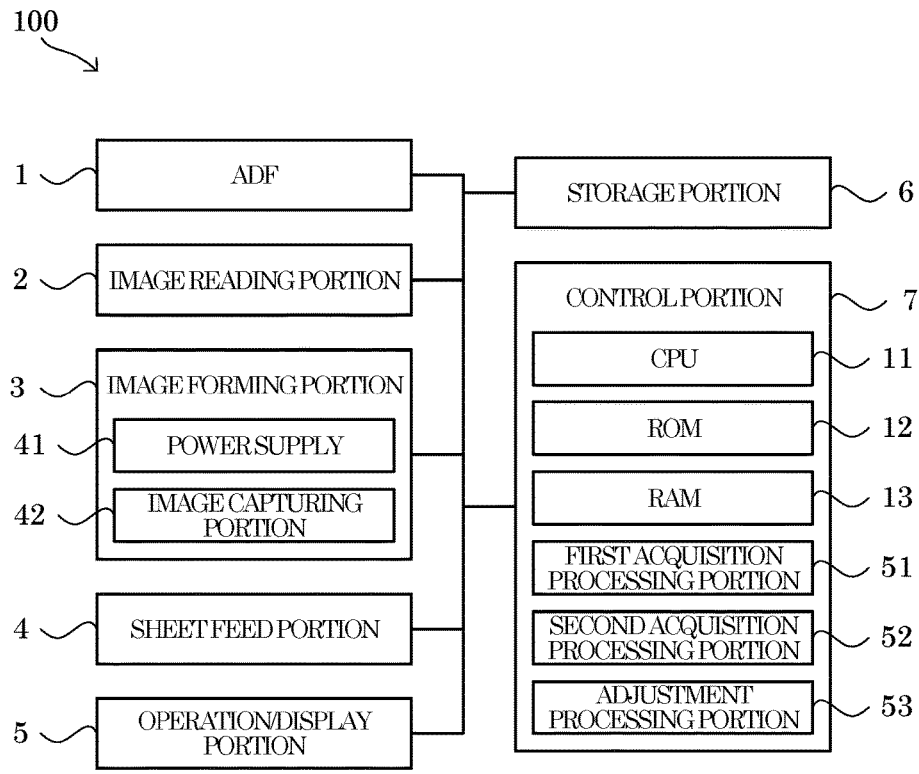
FIG. 2 is a block diagram showing a system configuration of the image forming apparatus according to the first embodiment of the present disclosure.

First, a description is given of a configuration of an image forming apparatus 100 according to a first embodiment of the present disclosure with reference to FIG. 1 and FIG. 2.

It is noted that, for the sake of explanation, a vertical direction in a state where the image forming apparatus 100 is usably installed (the state shown in FIG. 1), is defined as an up-down direction D1. In addition, a front-rear direction D2 is defined on the supposition that the left side of the image forming apparatus 100 in FIG. 1 is a front side (front). Furthermore, a left-right direction D3 is defined based on the image forming apparatus 100 in the installation state viewed from the front side.

The image forming apparatus 100 is a multifunction peripheral having a plurality of functions such as a scan function for reading image data from a document sheet, a print function for forming an image based on image data, a facsimile function, and a copy function. It is noted that the present disclosure is applicable to an image forming apparatus such as a printer, a facsimile apparatus, and a copier.

As shown in FIG. 1 and FIG. 2, the image forming apparatus 100 includes an ADF (Auto Document Feeder) 1, an image reading portion 2, an image forming portion 3, a sheet feed portion 4, an operation/display portion 5, a storage portion 6, and a control portion 7.

The ADF 1 conveys a document sheet that is a reading target of the scan function. The ADF 1 includes a document sheet setting portion, a plurality of conveyance rollers, a document sheet pressing member, and a sheet discharge portion.

The image reading portion 2 realizes the scan function. The image reading portion 2 includes a document sheet table, a light source, a plurality of mirrors, an optical lens, and a CCD (Charge Coupled Device).

The image forming portion 3 realizes the print function. Specifically, the image forming portion 3 forms, by an electrophotographic method, a color or monochrome image on a sheet supplied from the sheet feed portion 4.

The sheet feed portion 4 supplies a sheet to the image forming portion 3. The sheet feed portion 4 includes a sheet feed cassette, a manual feed tray, and a plurality of conveyance rollers.

The operation/display portion 5 is a user interface of the image forming apparatus 100. The operation/display portion 5 includes a display portion and an operation portion. The display portion is, for example, a liquid crystal display and displays various types of information in response to control instructions from the control portion 7. The operation portion is composed of, for example, operation keys or a touch panel through which various types of information are input to the control portion 7 in response to user operations.

The storage portion 6 is a nonvolatile storage device. For example, the storage portion 6 is a storage device such as: a nonvolatile memory such as a flash memory or an EEPROM; an SSD (Solid State Drive); or an HDD (Hard Disk Drive).

The control portion 7 comprehensively controls the image forming apparatus 100. As shown in FIG. 2, the control portion 7 includes a CPU 11, a ROM 12, and a RAM 13. The CPU 11 is a processor that executes various calculation processes. The ROM 12 is a nonvolatile storage device in which various information such as control programs for causing the CPU 11 to execute various processes are preliminarily stored. The RAM 13 is a volatile or nonvolatile storage device that is used as a temporary storage memory (working area) for the various processes executed by the CPU 11. The CPU 11 comprehensively controls the image forming apparatus 100 by executing the various control programs preliminarily stored in the ROM 12.

It is noted that the control portion 7 may be a control portion provided independently of a main control portion that comprehensively controls the image forming apparatus 100. In addition, the control portion 7 may be formed as an electronic circuit such as an integrated circuit (ASIC).

[Configuration of Image Forming Portion 3]

Next, a configuration of the image forming portion 3 is described with reference to FIG. 1 to FIG. 3. Here, FIG. 3 is a cross-section diagram showing a configuration of a plurality of image forming units 20, an intermediate transfer belt 26, and a secondary transfer roller 27.

As shown in FIG. 1, the image forming portion 3 includes four image forming units 20, a laser scanning unit 25, the intermediate transfer belt 26, the secondary transfer roller 27, a fixing device 28, and a sheet discharge tray 29. In addition, as shown in FIG. 2, the image forming portion 3 includes a power supply 41 and an image capturing portion 42.

Of the four image forming units 20, an image forming unit 21 (see FIG. 3) forms a Y (yellow) toner image. Of the four image forming units 20, an image forming unit 22 (see FIG. 3) forms a C (cyan) toner image. Of the four image forming units 20, an image forming unit 23 (see FIG. 3) forms an M (magenta) toner image. Of the four image forming units 20, an image forming unit 24 (see FIG. 3) forms a K (black) toner image. That is, the image forming portion 3 forms an image on a sheet using toners of colors C, M, Y, and K. As shown in FIG. 1 and FIG. 3, the four image forming units 20 are arranged in order of yellow, cyan, magenta, and black from the front side of the image forming apparatus 100 along the front-rear direction D2.

Figure 3:
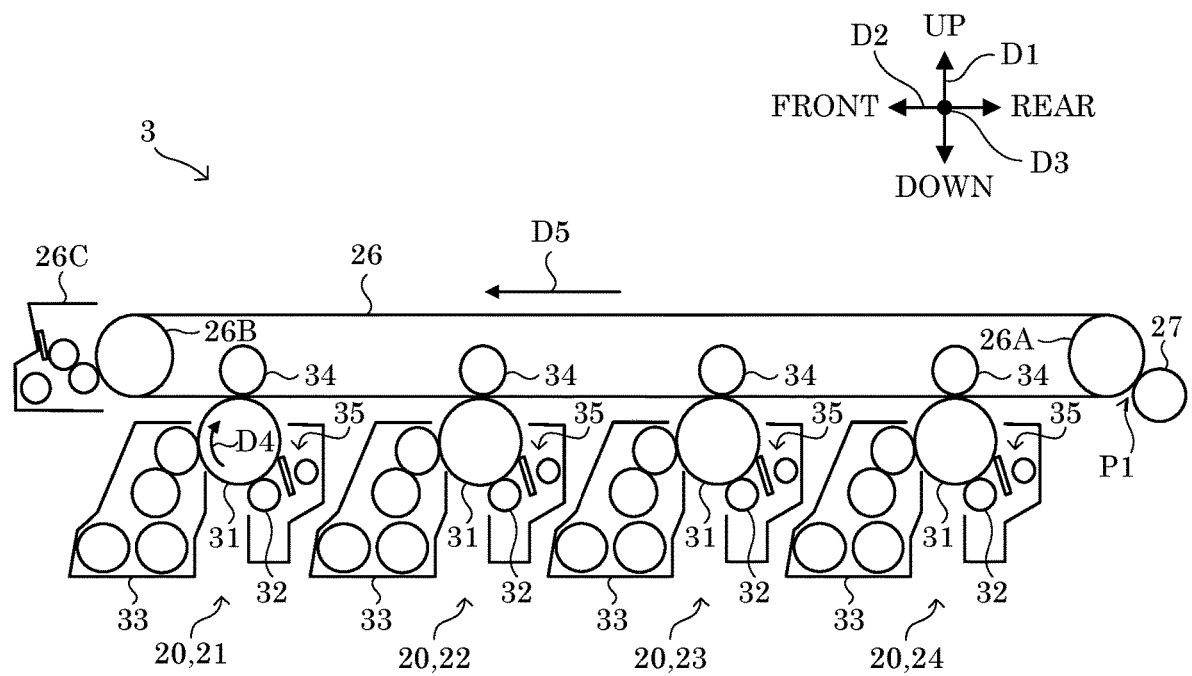
FIG. 3 is a cross-section diagram showing a configuration of an image forming portion of the image forming apparatus according to the first embodiment of the present disclosure.

As shown in FIG. 3, each of the image forming units 20 includes a photoconductor drum 31, a charging roller 32, a developing device 33, a primary transfer roller 34, and a drum cleaning portion 35. In addition, each of the image forming units 20 includes a toner container 36 shown in FIG. 1.

On a surface of the photoconductor drum 31, an electrostatic latent image is formed. For example, the photoconductor drum 31 has a photosensitive layer formed from amorphous silicon. Upon receiving a rotational driving force supplied from a motor (not shown), the photoconductor drum 31 rotates in a rotation direction D4 shown in FIG. 3. This allows the photoconductor drum 31 to convey the electrostatic latent image formed on its surface.

Upon receiving a supply of a predetermined charging voltage, the charging roller 32 electrically charges the surface of the photoconductor drum 31. For example, the charging roller 32 charges the surface of the photoconductor drum 31 to a positive polarity. The surface of the photoconductor drum 31 charged by the charging roller 32 is irradiated with light that is emitted from the laser scanning unit 25 based on image data. This forms an electrostatic latent image on the surface of the photoconductor drum 31.

The developing device 33 develops the electrostatic latent image formed on the surface of the photoconductor drum 31. The developing device 33 includes a pair of stirring members, a magnet roller, and a developing roller. The pair of stirring members stir developer stored inside the developing device 33, wherein the developer includes toner and carrier.

As the developer is stirred, the toner included in the developer makes friction with the carrier included in the developer, and the toner is charged to the positive polarity. The magnet roller draws up the developer stirred by the pair of stirring members and supplies the toner included in the developer to the developing roller. The developing roller conveys the toner supplied from the magnet roller to a position facing the photoconductor drum 31. In addition, upon receiving an application of a predetermined developing bias voltage, the developing roller supplies the toner conveyed to the position facing the photoconductor drum 31, to the photoconductor drum 31. This allows the electrostatic latent image formed on the surface of the photoconductor drum 31 to be visualized (developed). It is noted that the toner is supplied from the toner container 36 to the developing device 33.

The primary transfer roller 34, upon receiving a supply of a predetermined primary transfer current, transfers a toner image formed on the surface of the photoconductor drum 31 to an outer peripheral surface of the intermediate transfer belt 26. As shown in FIG. 3, the primary transfer roller 34 is disposed to face the photoconductor drum 31 across the intermediate transfer belt 26.

The drum cleaning portion 35 removes the toner that has remained on the surface of the photoconductor drum 31 after the transfer of the toner image by the primary transfer roller 34.

The laser scanning unit 25 emits light based on the image data, to the surfaces of the photoconductor drums 31 of the image forming units 20.

The intermediate transfer belt 26 is a belt member of an endless shape to which toner images formed on the surfaces of the photoconductor drums 31 of the image forming units 20 are transferred. The intermediate transfer belt 26 is stretched by a drive roller 26A (see FIG. 3) and a stretch roller 26B (see FIG. 3) with a predetermined tension. The intermediate transfer belt 26 rotates in a rotation direction D5 shown in FIG. 3 when the drive roller 26A rotates upon receiving a rotational driving force supplied from a motor (not shown). This allows the intermediate transfer belt 26 to convey the toner image formed on the outer peripheral surface thereof to a secondary transfer position P1 (see FIG. 3) where the toner image is transferred to a sheet by the secondary transfer roller 27. It is noted that the outer peripheral surface of the intermediate transfer belt 26 from which the toner image has been transferred by the secondary transfer roller 27 is cleaned by a belt cleaning portion 26C shown in FIG. 3.

The secondary transfer roller 27, upon receiving a supply of a predetermined secondary transfer current, transfers the toner image that has been transferred to the outer peripheral surface of the intermediate transfer belt 26, to a sheet supplied from the sheet feed portion 4. As shown in FIG. 3, the secondary transfer roller 27 is disposed to face the drive roller 26A across the intermediate transfer belt 26. The secondary transfer roller 27 is biased by a biasing member (not shown) towards the drive roller 26A so that the secondary transfer roller 27 comes in contact with the intermediate transfer belt 26 with a predetermined nip pressure. The secondary transfer roller 27, at the secondary transfer position P1 (see FIG. 3) where it comes in contact with the intermediate transfer belt 26, transfers the toner image formed on the intermediate transfer belt 26 to the sheet. The secondary transfer roller 27 is an example of a transfer portion of the present disclosure.

The fixing device 28 fixes the toner image transferred to the sheet by the secondary transfer roller 27, to the sheet. As shown in FIG. 1, the fixing device 28 includes a fixing roller 28A and a pressure roller 28B. The fixing roller 28A is heated to a predetermined fixing temperature by a heater (not shown). The fixing roller 28A is rotated at a predetermined speed. The pressure roller 28B is biased by a biasing member (not shown) towards the fixing roller 28A so that the pressure roller 28B comes in contact with the fixing roller 28A with a predetermined nip pressure. Between the fixing roller 28A and the pressure roller 28B is formed a fixing nip portion P2 (see FIG. 1) that heats and pressurizes a sheet. The toner image transferred to the sheet is heated and pressurized so as to be fixed to the sheet when the sheet passes through the fixing nip portion P2. The fixing device 28 is an example of a fixing portion of the present disclosure.

The sheet to which the toner image has been fixed by the fixing device 28 is discharged to the sheet discharge tray 29.

The power supply 41 is a constant current power supply that supplies the secondary transfer current to the secondary transfer roller 27. The power supply 41 supplies the secondary transfer current set by the control portion 7 to the secondary transfer roller 27. For example, the secondary transfer current is a current of a negative polarity.

The image capturing portion 42 captures an image of a sheet that has been conveyed via the secondary transfer position P1 (see FIG. 1) where the toner image is transferred to a sheet by the secondary transfer roller 27. In other words, the image capturing portion 42 reads an image of a sheet that has been conveyed via the secondary transfer position P1. Specifically, the image capturing portion 42 captures the image of the sheet at a downstream of the secondary transfer position P1 in a sheet conveyance path R1 (see the two-dot chain line with an arrow shown in FIG. 1) that extends from the sheet feed cassette to the sheet discharge tray 29 via the secondary transfer position P1 (see FIG. 1) and the fixing nip portion P2 (see FIG. 1). For example, as shown in FIG. 1, the image capturing portion 42 is disposed at a downstream of the fixing nip portion P2 in the conveyance path R1. The secondary transfer position P1 is an example of an image forming position of the present disclosure. It is noted that the image capturing portion 42 may be disposed at an upstream of the fixing nip portion P2 in the conveyance path R1.

For example, the image capturing portion 42 is a CIS (Contact Image Sensor) that includes a light emitting portion and a light receiving portion. The light emitting portion emits light toward a surface of a sheet that is conveyed along the conveyance path R1. The light receiving portion receives the light that has been emitted from the light emitting portion and reflected on the surface of the sheet, and outputs an electric signal that corresponds to an amount of received light.

The electric signal output from the light receiving portion of the image capturing portion 42 is converted into a digital signal (image data) by an analog front-end circuit (not shown). For example, the analog front-end circuit converts the electric signal output from the light receiving portion of the image capturing portion 42 into image data that represents colors of the pixels by R, G, and B of 256 gradations. The image data output from the analog front-end circuit is input to the control portion 7.

Meanwhile, in the image forming apparatus 100, an image may be formed on a sheet with an uneven surface such as a sheet of embossed paper. The toner is hardly adhered to a lower part of the uneven surface of the sheet. As a result, in the image forming apparatus 100, when an image is formed on a sheet with an uneven surface, an image forming condition such as the secondary transfer current is adjusted for the purpose of restricting the degradation of the formed image.

In addition, there is known, as a related technology, an image forming apparatus that adjusts the image forming condition based on the detection result of the sheet surface shape. In this image forming apparatus, the image forming condition is adjusted based on a variation width of a voltage that is applied to a transfer portion connected to a constant current power supply, when a sheet passes through a position where a toner image is transferred to the sheet by the transfer portion.

Here, on the sheet with the uneven surface, the larger the difference in the surface height is, the more hardly the toner is adhered to the lower part. However, the variation width of the voltage detected in the image forming apparatus of the related technology reflects both the difference in the sheet surface height and a ratio of the lower part to a higher part that is higher than the lower part, in the width direction of the sheet. Thus, the image forming apparatus of the related technology cannot adjust the image forming condition accurately.

On the other hand, as described in the following, the image forming apparatus 100 according to the first embodiment of the present disclosure can adjust the image forming condition accurately when an image is formed on a sheet with an uneven surface.

[Configuration of Control Portion 7]

Next, a configuration of the control portion 7 is described with reference to FIG. 2.

As shown in FIG. 2, the control portion 7 includes a first acquisition processing portion 51, a second acquisition processing portion 52, and an adjustment processing portion 53.

Specifically, a first image forming condition adjustment program for causing the CPU 11 to function as the above-described portions is preliminarily stored in the ROM 12 of the control portion 7. The CPU 11 functions as the above-described portions by executing the first image forming condition adjustment program stored in the ROM 12.

It is noted that the first image forming condition adjustment program may be recorded on a non-transitory computer-readable recording medium such as a CD, a DVD, or a flash memory, and may be read from the recording medium and installed in a storage device such as the storage portion 6. In addition, a part or all of the first acquisition processing portion 51, the second acquisition processing portion 52, and the adjustment processing portion 53 may be composed of an electronic circuit such as an integrated circuit (ASIC).

The first acquisition processing portion 51 acquires a captured image of a sheet.

Specifically, the first acquisition processing portion 51 acquires the captured image of the sheet by using the image capturing portion 42.

For example, when a predetermined conveyance timing arrives, the first acquisition processing portion 51 causes a sheet stored in the sheet feed cassette to be conveyed along the conveyance path R1. Subsequently, the first acquisition processing portion 51 uses the image capturing portion 42 to capture an image of the sheet that is conveyed upon the arrival of the conveyance timing.

For example, the conveyance timing is a timing when an instruction to execute a print process for forming an image on a sheet has been input. It is noted that the conveyance timing may be a timing when a predetermined user operation has been performed on the operation/display portion 5.

It is noted that the first acquisition processing portion 51 may acquire the captured image of the sheet by using the image reading portion 2. For example, when the predetermined user operation has been performed on the operation/display portion 5, the first acquisition processing portion 51 may use the image reading portion 2 to capture an image of a sheet that is placed on the document sheet table or a sheet that is conveyed by the ADF 1.

The second acquisition processing portion 52 acquires a specific value that indicates a difference between: a gradation value of a pixel, among pixels included in the captured image of the sheet acquired by the first acquisition processing portion 51, that corresponds to the higher part of an outer surface of the sheet; and a gradation value of a pixel, among the pixels included in the captured image, that corresponds to the lower part that is lower than the higher part.

Specifically, the second acquisition processing portion 52 acquires, as the specific value, a difference between: a gradation value that, in a histogram of gradation values of the pixels included in the captured image of the sheet, corresponds to a local maximum value of the highest frequency; and a gradation value that corresponds to a local maximum value of the second highest frequency.

For example, the second acquisition processing portion 52 acquires a histogram of gradation values of G (green) that shows an appearance frequency for each gradation value of G in the captured image of the sheet acquired by the first acquisition processing portion 51, based on gradation values of G of the pixels included in the captured image. Specifically, the second acquisition processing portion 52 acquires the histogram of gradation values of G by totaling, for each gradation value of G, the number of appearances of a pixel having a gradation value of G in the captured image of the sheet.

Figure 4:
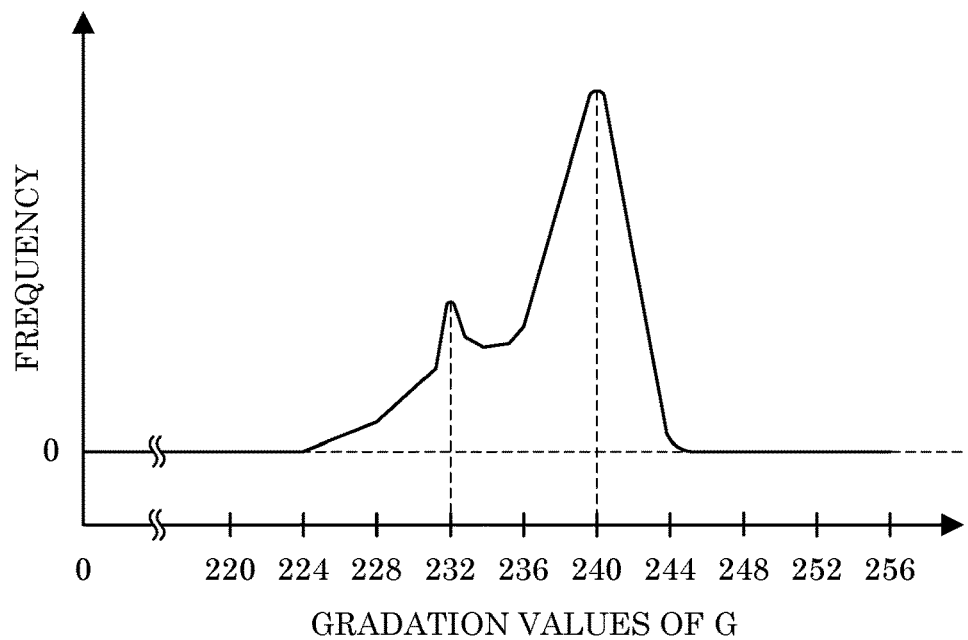
FIG. 4 is a diagram showing an example of a histogram acquired by the image forming apparatus according to the first embodiment of the present disclosure.
Figure 5:
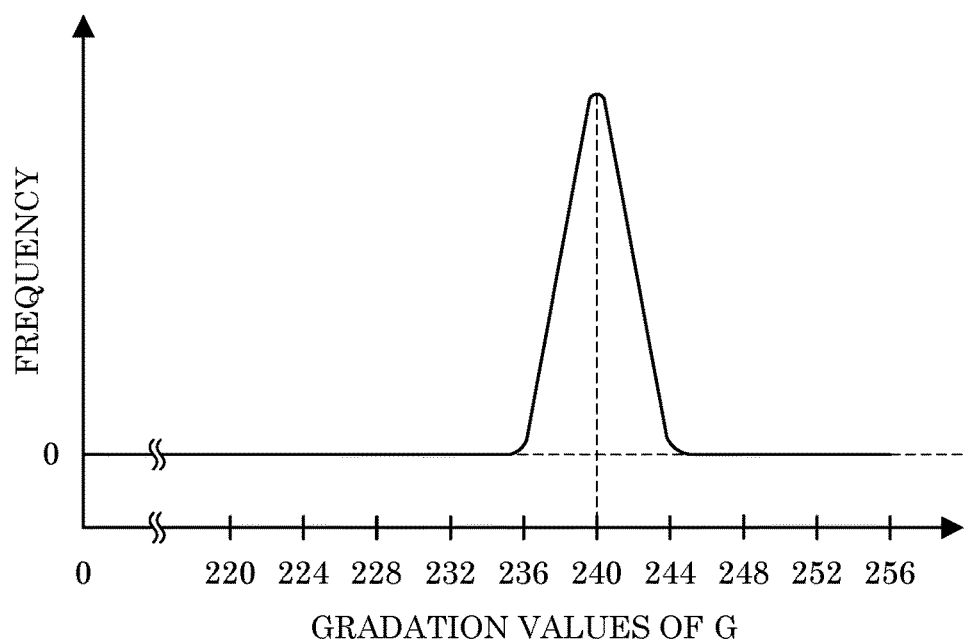
FIG. 5 is a diagram showing an example of the histogram acquired by the image forming apparatus according to the first embodiment of the present disclosure.

Here, FIG. 4 and FIG. 5 show examples of the histogram of gradation values of G acquired by the second acquisition processing portion 52.

FIG. 4 shows an example of the histogram of gradation values of G acquired by the second acquisition processing portion 52 when an image of a first sheet having an uneven surface is captured. The first sheet is a sheet whose surface includes a flat part and a plurality of recesses.

FIG. 5 shows an example of the histogram of gradation values of G acquired by the second acquisition processing portion 52 when an image of a second sheet having an even surface is captured.

As shown in FIG. 5, when the first acquisition processing portion 51 acquires a captured image of the second sheet, only one peak (local maximum value) of frequency appears. A gradation value of G that corresponds to the peak is a gradation value of G of a pixel corresponding to the surface of the second sheet.

On the other hand, as shown in FIG. 4, when the first acquisition processing portion 51 acquires a captured image of the first sheet, two peaks (local maximum values) of frequency appears. A gradation value of G that corresponds to, of the two peaks, the peak of a higher frequency is a gradation value of G of a pixel corresponding to the flat part of the first sheet. In addition, a gradation value of G that corresponds to, of the two peaks, the peak of a lower frequency is a gradation value of G of a pixel corresponding to a recess of the first sheet.

For example, when the acquired histogram of gradation values of G includes a plurality of peaks, the second acquisition processing portion 52 acquires, as the specific value, a difference between a gradation value corresponding to a peak (local maximum value) of the highest frequency and a gradation value corresponding to a peak (local maximum value) of the second highest frequency. On the other hand, when the acquired histogram of gradation values of G does not include a plurality of peaks, the second acquisition processing portion 52 does not acquire the specific value.

It is noted that when the acquired histogram of gradation values of G includes three or more peaks, the second acquisition processing portion 52 may acquire, as the specific value, a difference between: a gradation value corresponding to a peak that appears in an area including the highest frequency; and a gradation value corresponding to a peak that appears in an area including the lowest frequency.

In addition, when the first acquisition processing portion 51 has acquired a captured image of a sheet, the second acquisition processing portion 52 may acquire a histogram of gradation values of R or B among gradation values of R, G, and B of pixels included in the captured image. In addition, the second acquisition processing portion 52 may acquire a histogram of average values of gradation values of R, G, and B.

In addition, the second acquisition processing portion 52 may detect a plurality of areas of different heights included a sheet whose image has been captured, based on an image indicating stepped parts included in the captured image of the sheet. In this case, the second acquisition processing portion 52 may acquire the specific value by determining, among the plurality of areas included in the sheet whose image has been captured, an area having the highest gradation value of pixel as the higher part and determining an area having the lowest gradation value of pixel as the lower part.

The adjustment processing portion 53 adjusts the image forming condition of the image forming portion 3 based on the specific value acquired by the second acquisition processing portion 52.

Specifically, the adjustment processing portion 53 adjusts the nip pressure at the secondary transfer position P1 based on the specific value acquired by the second acquisition processing portion 52. The nip pressure at the secondary transfer position P1 is an example of the image forming condition of the present disclosure, and an example of a transfer condition under which a toner image is transferred by a transfer portion of the present disclosure.

In addition, the adjustment processing portion 53 adjusts the secondary transfer current supplied to the secondary transfer roller 27, based on the specific value acquired by the second acquisition processing portion 52. The secondary transfer current is an example of the image forming condition of the present disclosure, and an example of the transfer condition under which the toner image is transferred by the transfer portion of the present disclosure.

In addition, the adjustment processing portion 53 adjusts the fixing temperature of the fixing roller 28A based on the specific value acquired by the second acquisition processing portion 52. The fixing temperature is an example of the image forming condition of the present disclosure, and an example of a fixing condition under which the toner image is fixed by the fixing portion of the present disclosure.

In addition, the adjustment processing portion 53 adjusts a nip pressure at the fixing nip portion P2 based on the specific value acquired by the second acquisition processing portion 52. The nip pressure at the fixing nip portion P2 is an example of the image forming condition of the present disclosure, and an example of the fixing condition under which the toner image is fixed by the fixing portion of the present disclosure.

In addition, the adjustment processing portion 53 adjusts a rotation speed of the fixing roller 28A based on the specific value acquired by the second acquisition processing portion 52. The rotation speed of the fixing roller 28A is an example of the image forming condition of the present disclosure, and an example of the fixing condition under which the toner image is fixed by the fixing portion of the present disclosure.

For example, when the second acquisition processing portion 52 has acquired the specific value, the adjustment processing portion 53 determines an unevenness depth level of the sheet based on the specific value. For example, in the image forming apparatus 100, the unevenness depth level is determined as one of six levels from level 1 (most shallow) to level 6 (most deep) depending on the height of the specific value.

In addition, in the image forming apparatus 100, a first table data TD11 (see FIG. 6) is preliminarily stored in the storage portion 6, wherein the first table data TD11 shows a correspondence relationship between the unevenness depth level and an adjustment amount of the nip pressure at the secondary transfer position P1.

The adjustment processing portion 53 consults the first table data TD11 to identify an adjustment amount of the nip pressure at the secondary transfer position P1 corresponding to the determined unevenness depth level. Subsequently, the adjustment processing portion 53 adjusts the nip pressure at the secondary transfer position P1 based on the identified adjustment amount.

In addition, in the image forming apparatus 100, a second table data TD12 (see FIG. 7) is preliminarily stored in the storage portion 6, wherein the second table data TD12 shows a correspondence relationship between the unevenness depth level and an adjustment amount of the secondary transfer current.

The adjustment processing portion 53 consults the second table data TD12 to identify an adjustment amount of the secondary transfer current corresponding to the determined unevenness depth level. Subsequently, the adjustment processing portion 53 adjusts the secondary transfer current based on the identified adjustment amount.

In addition, in the image forming apparatus 100, a third table data TD13 (see FIG. 8) is preliminarily stored in the storage portion 6, wherein the third table data TD13 shows a correspondence relationship between the unevenness depth level and an adjustment amount of the fixing temperature.

The adjustment processing portion 53 consults the third table data TD13 to identify an adjustment amount of the fixing temperature corresponding to the determined unevenness depth level. Subsequently, the adjustment processing portion 53 adjusts the fixing temperature based on the identified adjustment amount.

In addition, in the image forming apparatus 100, a fourth table data TD14 (see FIG. 9) is preliminarily stored in the storage portion 6, wherein the fourth table data TD14 shows a correspondence relationship between the unevenness depth level and an adjustment amount of the nip pressure at the fixing nip portion P2.

The adjustment processing portion 53 consults the fourth table data TD14 to identify an adjustment amount of the nip pressure at the fixing nip portion P2 corresponding to the determined unevenness depth level. Subsequently, the adjustment processing portion 53 adjusts the nip pressure at the fixing nip portion P2 based on the identified adjustment amount.

Figure 10:
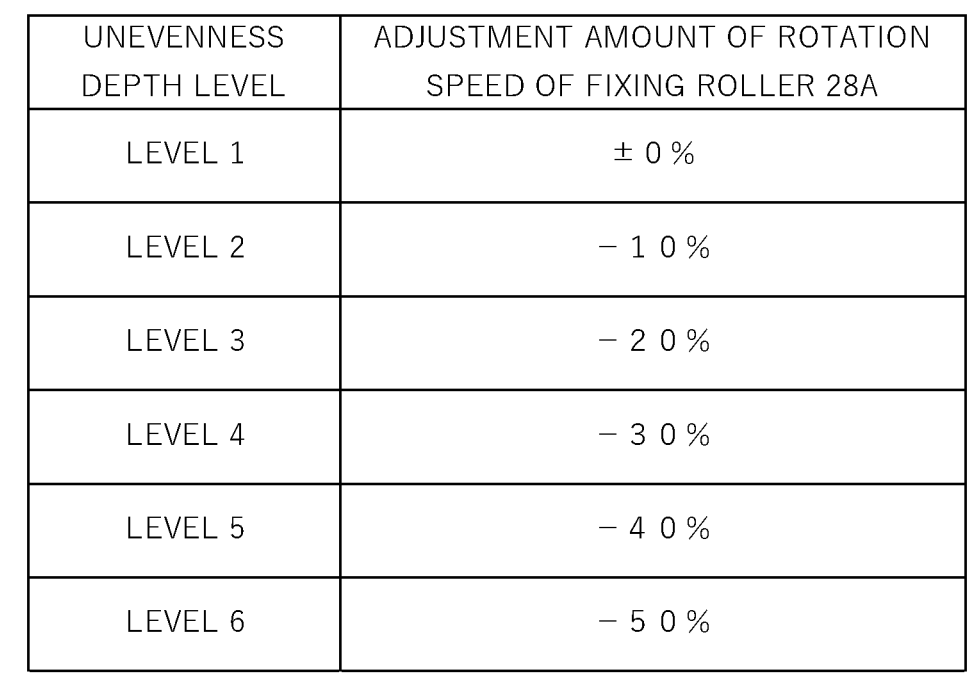
FIG. 10 is a diagram showing an example of fifth table data used to adjust an image forming condition in the image forming apparatus according to the first embodiment of the present disclosure.

In addition, in the image forming apparatus 100, a fifth table data TD15 (see FIG. 10) is preliminarily stored in the storage portion 6, wherein the fifth table data TD15 shows a correspondence relationship between the unevenness depth level and an adjustment amount of the rotation speed of the fixing roller 28A.

The adjustment processing portion 53 consults the fifth table data TD15 to identify an adjustment amount of the rotation speed of the fixing roller 28A corresponding to the determined unevenness depth level. Subsequently, the adjustment processing portion 53 adjusts the rotation speed of the fixing roller 28A based on the identified adjustment amount.

It is noted that the adjustment processing portion 53 may acquire an adjustment amount of an image forming condition corresponding to a specific value acquired by the second acquisition processing portion 52, by using a relational expression that represents a relationship between the specific value and the adjustment amount of the image forming condition.

[First Image Forming Condition Adjustment Process]

Figure 11:
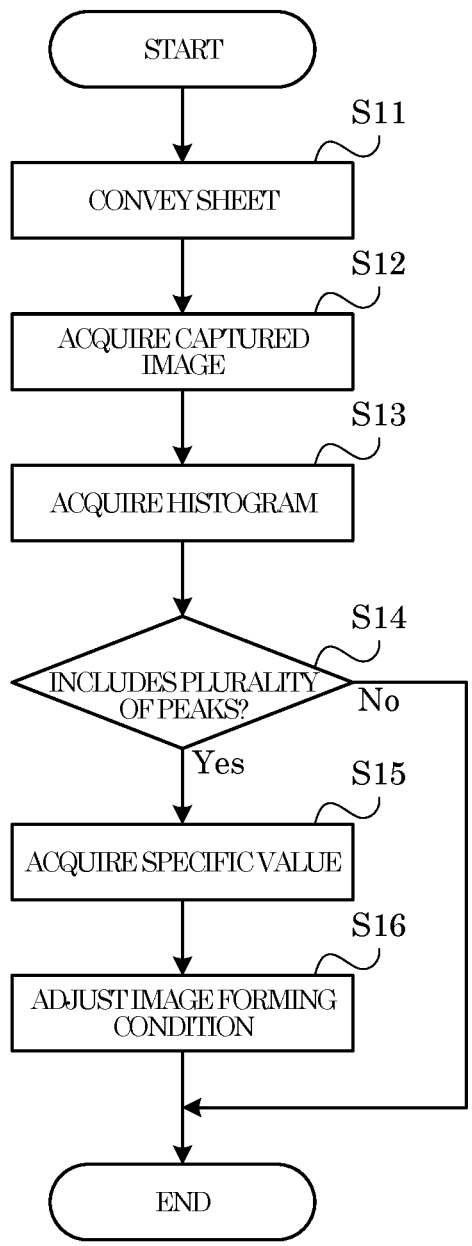
FIG. 11 is a flowchart showing an example of a first image forming condition adjustment process executed by the image forming apparatus according to the first embodiment of the present disclosure.

In the following, with reference to FIG. 11, a description is given of an example of the procedure of a first image forming condition adjustment process executed by the control portion 7 in the image forming apparatus 100, as well as a first image forming condition adjustment method of the present disclosure. Here, steps S11, S12, . . . represent numbers assigned to the processing procedures (steps) executed by the control portion 7. It is noted that the control portion 7 executes the first image forming condition adjustment process when the conveyance timing has arrived.

<Step S11>

First, in step S11, the control portion 7 causes a sheet stored in the sheet feed cassette to be conveyed along the conveyance path R1.

<Step S12>

In step S12, the control portion 7 uses the image capturing portion 42 to acquire a captured image of the sheet that is conveyed by the process of step S11. Here, the process of step S12 is an example of a first acquisition step of the present disclosure, and is executed by the first acquisition processing portion 51 of the control portion 7.

<Step S13>

In step S13, the control portion 7 acquires, based on the captured image acquired in step S12, a histogram of gradation values of G of pixels included in the captured image.

<Step S14>

In step S14, the control portion 7 determines whether or not the histogram of gradation values of G acquired in step S13 includes a plurality of peaks.

Here, upon determining that the histogram of gradation values of G acquired in step S13 includes a plurality of peaks (Yes side at S14), the control portion 7 moves the process to step S15. In addition, upon determining that the histogram does not include a plurality of peaks (No side at S14), the control portion 7 ends the first image forming condition adjustment process.

<Step S15>

In step S15, the control portion 7 acquires the specific value. Here, the process of step S15 is an example of a second acquisition step of the present disclosure, and is executed by the second acquisition processing portion 52 of the control portion 7.

Specifically, the control portion 7 acquires, as the specific value, a difference between: a gradation value corresponding to a peak (local maximum value) of the highest frequency; and a gradation value corresponding to a peak (local maximum value) of the second highest frequency in the histogram of gradation values of G acquired in step S13.

<Step S16>

In step S16, the control portion 7 adjusts the image forming condition based on the specific value acquired in step S15. Here, the process of step S16 is an example of an adjustment step of the present disclosure, and is executed by the adjustment processing portion 53 of the control portion 7.

Specifically, the control portion 7 determines the unevenness depth level based on the specific value acquired in step S15.

In addition, the control portion 7 consults the first table data TD11 (see FIG. 6) to identify an adjustment amount of the nip pressure at the secondary transfer position P1 corresponding to the determined unevenness depth level. Subsequently, the control portion 7 adjusts the nip pressure at the secondary transfer position P1 based on the identified adjustment amount.

In addition, the control portion 7 consults the second table data TD12 (see FIG. 7) to identify an adjustment amount of the secondary transfer current corresponding to the determined unevenness depth level. Subsequently, the control portion 7 adjusts the secondary transfer current based on the identified adjustment amount.

In addition, the control portion 7 consults the third table data TD13 (see FIG. 8) to identify an adjustment amount of the fixing temperature corresponding to the determined unevenness depth level. Subsequently, the control portion 7 adjusts the fixing temperature based on the identified adjustment amount.

In addition, the control portion 7 consults the fourth table data TD14 (see FIG. 9) to identify an adjustment amount of the nip pressure at the fixing nip portion P2 corresponding to the determined unevenness depth level. Subsequently, the control portion 7 adjusts the nip pressure at the fixing nip portion P2 based on the identified adjustment amount.

In addition, the control portion 7 consults the fifth table data TD15 (see FIG. 10) to identify an adjustment amount of the rotation speed of the fixing roller 28A corresponding to the determined unevenness depth level. Subsequently, the control portion 7 adjusts the rotation speed of the fixing roller 28A based on the identified adjustment amount.

As described above, the image forming apparatus 100 acquires the specific value that indicates a difference between: a gradation value of a pixel, among pixels included in a captured image of a sheet, that corresponds to the higher part of an outer surface of the sheet; and a gradation value of a pixel, among the pixels included in the captured image, that corresponds to the lower part. In addition, the image forming condition is adjusted based on the acquired specific value. With this configuration, when an image is formed on a sheet with an uneven surface, compared with the image forming apparatus of the related technology, it is possible to adjust the image forming condition accurately.

In addition, the image forming apparatus 100 acquires, as the specific value, a difference between: a gradation value that corresponds to a local maximum value of the highest frequency in a histogram of gradation values of the pixels included in the captured image of the sheet; and a gradation value that corresponds to a local maximum value of the second highest frequency. With this configuration, compared with a configuration where a plurality of areas of different heights that are included a sheet whose image has been captured, are detected from the captured image of the sheet, and the specific value is acquired based on the detection result, it is possible to acquire the specific value by a simple process.

Second Embodiment

Figure 12:
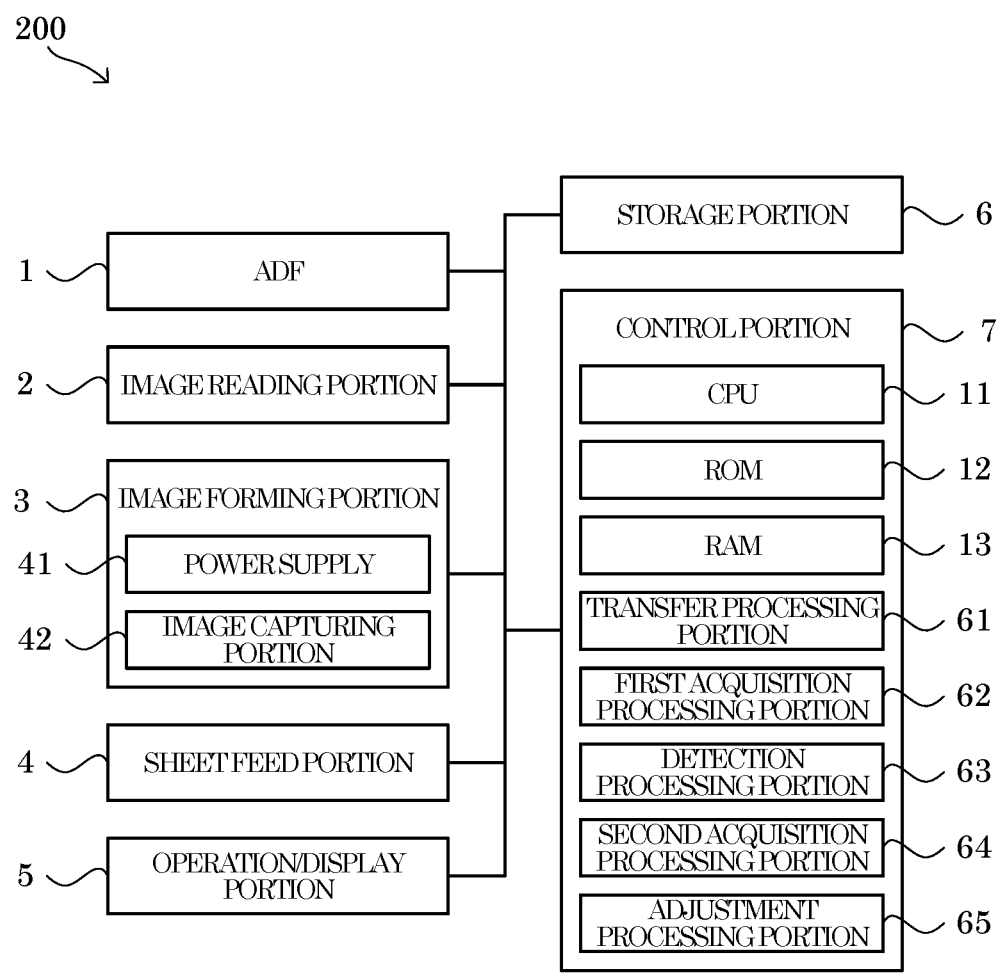
FIG. 12 is a block diagram showing a system configuration of an image forming apparatus according to a second embodiment of the present disclosure.

Next, a description is given of a configuration of an image forming apparatus 200 according to a second embodiment of the present disclosure with reference to FIG. 12.

The image forming apparatus 200 according to the second embodiment includes the control portion 7 that has a different configuration from that of the image forming apparatus 100 according to the first embodiment. It is noted that the image forming apparatus 100 and the image forming apparatus 200 have the same components other than the control portion 7.

As shown in FIG. 12, the control portion 7 of the image forming apparatus 200 includes a transfer processing portion 61, a first acquisition processing portion 62, a detection processing portion 63, a second acquisition processing portion 64, and an adjustment processing portion 65.

Specifically, a second image forming condition adjustment program for causing the CPU 11 to function as the above-described portions is preliminarily stored in the ROM 12 of the control portion 7. The CPU 11 functions as the above-described portions by executing the second image forming condition adjustment program stored in the ROM 12.

It is noted that the second image forming condition adjustment program may be recorded on a non-transitory computer-readable recording medium such as a CD, a DVD, or a flash memory, and may be read from the recording medium and installed in a storage device such as the storage portion 6. In addition, a part or all of the transfer processing portion 61, the first acquisition processing portion 62, the detection processing portion 63, the second acquisition processing portion 64, and the adjustment processing portion 65 may be composed of an electronic circuit such as an integrated circuit (ASIC).

The transfer processing portion 61 transfers, to a sheet, a specific toner image that includes: a first toner layer of a first color formed on the intermediate transfer belt 26; and a second toner layer of a second color formed on the first toner layer, wherein the first color is any one of colors C, M, and Y, and the second color is any one of the colors C, M, and Y and is different from the first color. The intermediate transfer belt 26 is an example of an image-carrying member of the present disclosure.

For example, the first toner layer is a toner image of C (cyan). In addition, the second toner layer is a toner image of M (magenta). In this case, the first color is C (cyan), and the second color is M (magenta). In addition, the specific toner image is a toner image of B (blue) that is a color mixture of the first color and the second color.

For example, in the image forming apparatus 200, first image data that is used by the image forming unit 22 to form the first toner layer is preliminarily stored in the storage portion 6. The first image data includes a first image that corresponds to the first toner layer formed on the intermediate transfer belt 26 by the image forming unit 22. For example, the first image is a rectangular image of a predetermined size. In addition, the first image is a single-color image of C (cyan) having a predetermined specific density.

In addition, in the image forming apparatus 200, second image data that is used by the image forming unit 23 to form the second toner layer is preliminarily stored in the storage portion 6. The second image data includes a second image that corresponds to the second toner layer formed by the image forming unit 23 on the first toner layer. For example, the second image has the same shape as the first image. In addition, the second image is a single-color image of M (magenta) having the specific density.

The transfer processing portion 61 transfers the specific toner image to a sheet by using the image forming unit 22, the image forming unit 23, the laser scanning unit 25, the intermediate transfer belt 26, the secondary transfer roller 27, the sheet feed portion 4, the first image data, and the second image data. Specifically, the transfer processing portion 61 forms the first toner layer on the photoconductor drum 31 of the image forming unit 22, and transfers the first toner layer onto the intermediate transfer belt 26. In addition, the transfer processing portion 61 forms the second toner layer on the photoconductor drum 31 of the image forming unit 23, and transfers the second toner layer onto the first toner layer formed on the intermediate transfer belt 26. This forms the specific toner image on the intermediate transfer belt 26. Subsequently, the transfer processing portion 61 transfers the specific toner image from the intermediate transfer belt 26 to a sheet conveyed by the sheet feed portion 4. This forms, on the sheet, a toner image in which the layers of the specific toner image are arranged upside down.

For example, when the conveyance timing arrives, the transfer processing portion 61 causes a sheet stored in the sheet feed cassette to be conveyed along the conveyance path R1. Subsequently, the transfer processing portion 61 transfers the specific toner image to the sheet that is conveyed upon the arrival of the conveyance timing.

The first acquisition processing portion 62 acquires the captured image of the sheet.

Specifically, the first acquisition processing portion 62 uses the image capturing portion 42 to acquires the captured image of the sheet to which the specific toner image has been transferred by the transfer processing portion 61.

It is noted that the first acquisition processing portion 62 may acquire the captured image of the sheet by using the image reading portion 2. For example, when a predetermined user operation is received after the sheet to which the specific toner image has been transferred by the transfer processing portion 61 is discharged to the sheet discharge tray 29, the first acquisition processing portion 62 may use the image reading portion 2 to capture an image of a sheet that is placed on the document sheet table or a sheet that is conveyed by the ADF 1.

The detection processing portion 63 detects a specific image that corresponds to the specific toner image included in the captured image of the sheet acquired by the first acquisition processing portion 62.

For example, the detection processing portion 63 detects, as the specific image, a colored area (an area of a color that is different from a base color of the sheet) having the same shape as the specific toner image included in the captured image of the sheet.

The second acquisition processing portion 64 acquires a skewness of a histogram of gradation values of a color mixture of the second color and a third color in the pixels included in the specific image detected by the detection processing portion 63, the third color being a color different from the first color and the second color among C, M, and Y.

For example, when the first color is C (cyan) and the second color is M (magenta), the third color is Y (yellow). In this case, the color mixture of the second color and the third color is R (red).

For example, the second acquisition processing portion 64 acquires a histogram of gradation values of R (red) that indicates an appearance frequency for each gradation value of R in the specific image, based on gradation values of R of the pixels included in the specific image detected by the detection processing portion 63. Specifically, the second acquisition processing portion 64 acquires the histogram of gradation values of R by totaling, for each gradation value of R, the number of appearances of a pixel having a gradation value of R in the specific image. Subsequently, the second acquisition processing portion 64 calculates the skewness of the histogram based on the acquired histogram.

Figure 13:
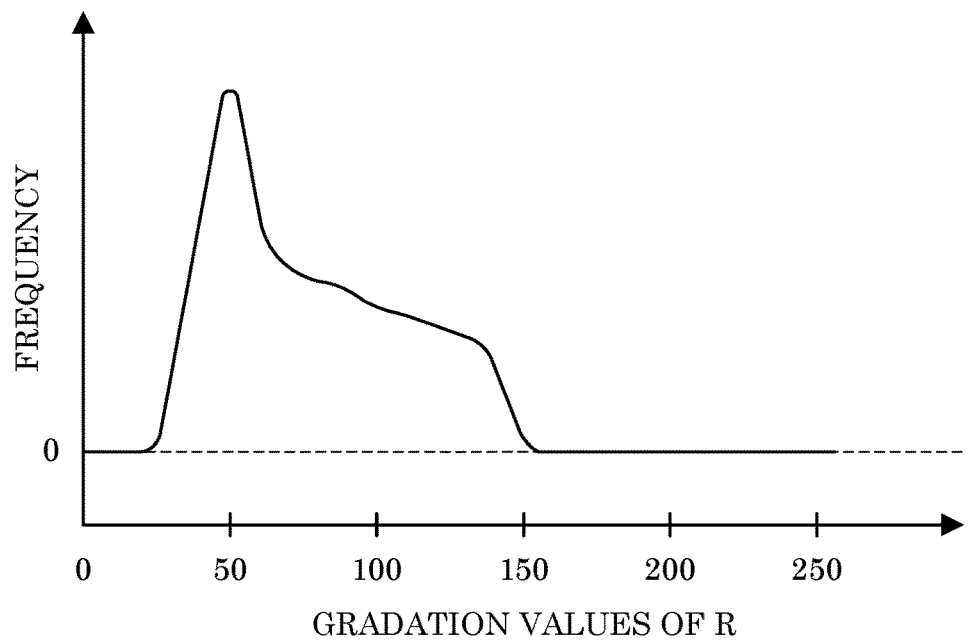
FIG. 13 is a diagram showing an example of a histogram acquired by the image forming apparatus according to the second embodiment of the present disclosure.
Figure 14:
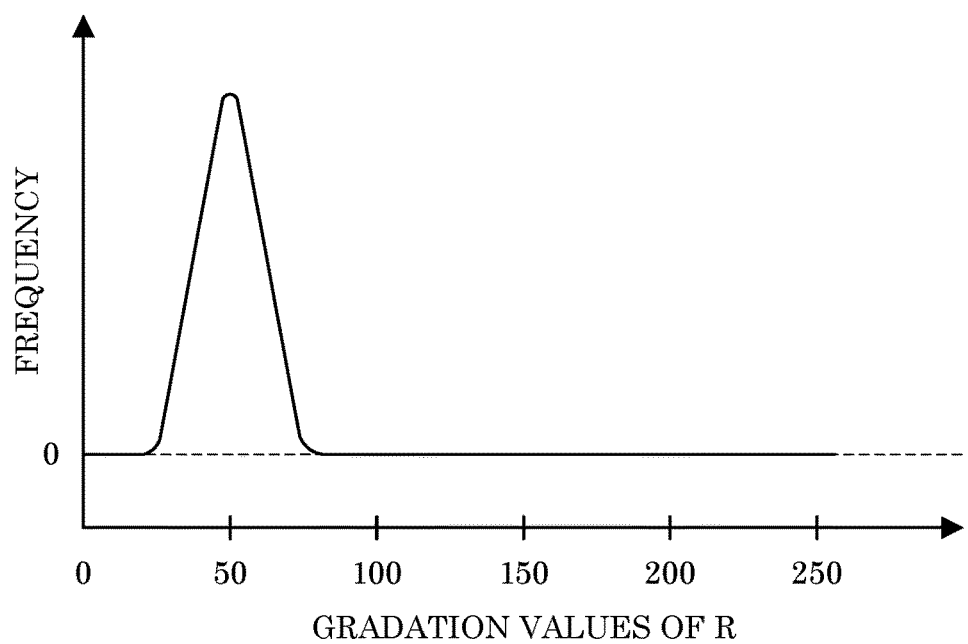
FIG. 14 is a diagram showing an example of the histogram acquired by the image forming apparatus according to the second embodiment of the present disclosure.

Here, FIG. 13 and FIG. 14 show examples of the histogram of gradation values of R acquired by the second acquisition processing portion 64.

FIG. 13 shows an example of the histogram of gradation values of R acquired by the second acquisition processing portion 64 when the specific image indicates the specific toner image transferred to the first sheet.

In addition, FIG. 14 shows an example of the histogram of gradation values of R acquired by the second acquisition processing portion 64 when the specific image indicates the specific toner image transferred to the second sheet.

As shown in FIG. 14, when the specific image indicates the specific toner image transferred to the second sheet, the skewness of the histogram of gradation values of R is substantially 0 (zero).

On the other hand, as shown in FIG. 13, when the specific image indicates the specific toner image transferred to the first sheet, the skewness of the histogram of gradation values of R is a value of the positive side. The value becomes higher as the difference in height between the flat part and the recesses of the first sheet becomes larger. This is because the transfer of the first layer to the recesses tends to be insufficient since the distance to the recesses from the first layer is larger than that from the second layer, and the second toner layer transferred to the sheet tends to be exposed correspondingly.

The adjustment processing portion 65 adjusts the image forming condition of the image forming portion 3 based on the skewness acquired by the second acquisition processing portion 64.

Specifically, the adjustment processing portion 65 adjusts the nip pressure at the secondary transfer position P1 based on the skewness acquired by the second acquisition processing portion 64.

In addition, the adjustment processing portion 65 adjusts the secondary transfer current supplied to the secondary transfer roller 27, based on the skewness acquired by the second acquisition processing portion 64.

For example, when the second acquisition processing portion 64 has acquired the skewness, the adjustment processing portion 65 determines the unevenness depth level based on the skewness. For example, in the image forming apparatus 200, the unevenness depth level is determined as one of six levels from level 1 (most shallow) to level 6 (most deep) depending on the height of the skewness. It is noted that when the difference in sheet surface height is large, the skewness acquired by the second acquisition processing portion 64 may be a value of the negative side. In this case, the adjustment processing portion 65 may determine the unevenness depth level as the maximum (level 6).

In addition, the adjustment processing portion 65 consults the first table data TD11 (see FIG. 6) to identify an adjustment amount of the nip pressure at the secondary transfer position P1 corresponding to the determined unevenness depth level. Subsequently, the adjustment processing portion 65 adjusts the nip pressure at the secondary transfer position P1 based on the identified adjustment amount.

In addition, the adjustment processing portion 65 consults the second table data TD12 (see FIG. 7) to identify an adjustment amount of the secondary transfer current corresponding to the determined unevenness depth level. Subsequently, the adjustment processing portion 65 adjusts the secondary transfer current based on the identified adjustment amount.

It is noted that the adjustment processing portion 65 may adjust one or more of the fixing temperature, the nip pressure at the fixing nip portion P2, and the rotation speed of the fixing roller 28A, based on the skewness acquired by the second acquisition processing portion 64.

It is noted that the adjustment processing portion 65 may acquire an adjustment amount of an image forming condition corresponding to a skewness acquired by the second acquisition processing portion 64, by using a relational expression that represents a relationship between the skewness and the adjustment amount of the image forming condition.

[Second Image Forming Condition Adjustment Process]

Figure 15:
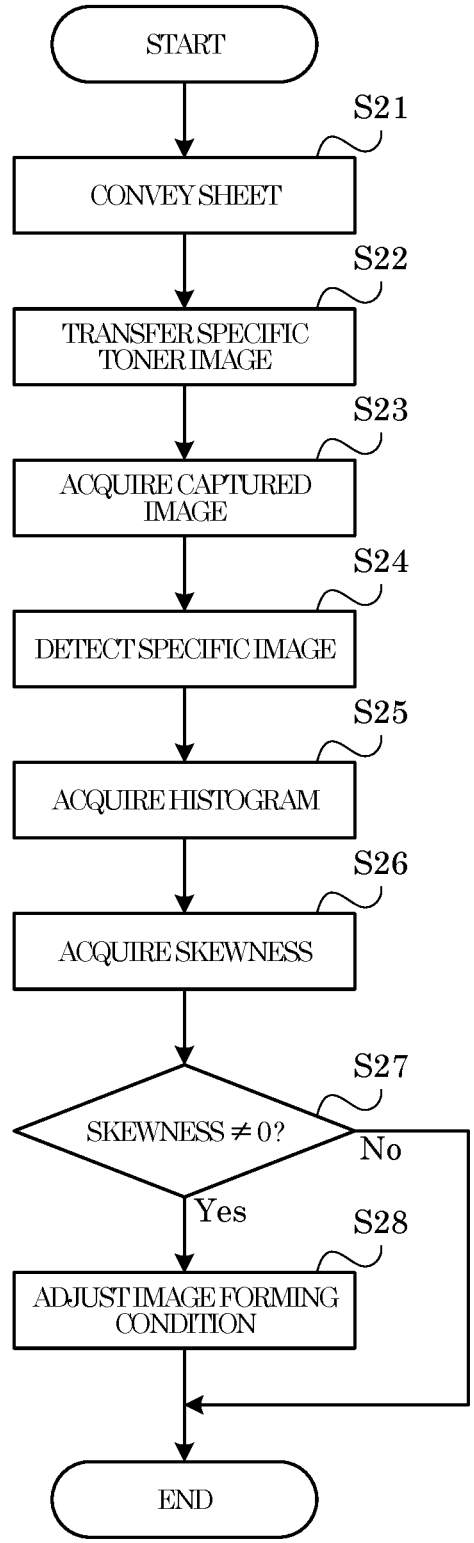
FIG. 15 is a flowchart showing an example of a second image forming condition adjustment process executed by the image forming apparatus according to the second embodiment of the present disclosure.

In the following, with reference to FIG. 15, a description is given of an example of the procedure of a second image forming condition adjustment process executed by the control portion 7 in the image forming apparatus 200, as well as a second image forming condition adjustment method of the present disclosure. It is noted that the control portion 7 executes the second image forming condition adjustment process when the conveyance timing has arrived.

<Step S21>

First, in step S21, the control portion 7 causes a sheet stored in the sheet feed cassette to be conveyed along the conveyance path R1.

<Step S22>

In step S22, the control portion 7 transfers the specific toner image to a sheet conveyed by the process of step S21. Here, the process of step S22 is an example of a transfer step of the present disclosure, and is executed by the transfer processing portion 61 of the control portion 7.

Specifically, the control portion 7 forms the first toner layer on the photoconductor drum 31 of the image forming unit 22, and transfers the first toner layer onto the intermediate transfer belt 26. In addition, the control portion 7 forms the second toner layer on the photoconductor drum 31 of the image forming unit 23, and transfers the second toner layer onto the first toner layer formed on the intermediate transfer belt 26. This forms the specific toner image on the intermediate transfer belt 26. Subsequently, the control portion 7 transfers the specific toner image from the intermediate transfer belt 26 to the sheet conveyed by the process of step S21.

<Step S23>

In step S23, the control portion 7 uses the image capturing portion 42 to acquire a captured image of the sheet to which the specific toner image has been transferred. Here, the process of step S23 is an example of the first acquisition step of the present disclosure, and is executed by the first acquisition processing portion 62 of the control portion 7.

<Step S24>

In step S24, the control portion 7 detects the specific image from the captured image of the sheet acquired in step S23. Here, the process of step S24 is an example of a detection step of the present disclosure, and is executed by the detection processing portion 63 of the control portion 7.

Specifically, the control portion 7 detects, as the specific image, a colored area having the same shape as the specific toner image included in the captured image of the sheet.

<Step S25>

In step S25, the control portion 7 acquires a histogram of gradation values of a color mixture of the second color and the third color in the pixels included in the specific image detected in step S24.

Specifically, the control portion 7 acquires the histogram of gradation values of R based on the gradation values of R of the pixels included in the specific image detected in step S24.

<Step S26>

In step S26, the control portion 7 acquires the skewness of the histogram based on the histogram acquired in step S25. Here, the processes of steps S25 and S26 are an example of the second acquisition step of the present disclosure, and are executed by the second acquisition processing portion 64 of the control portion 7.

<Step S27>

In step S27, the control portion 7 determines whether or not the skewness acquired in step S26 is different from 0 (zero).

Here, upon determining that the skewness acquired in step S26 is different from 0 (zero) (Yes side at S27), the control portion 7 moves the process to step S28. In addition, upon determining that the skewness acquired in step S26 is 0 (zero) (No side at S27), the control portion 7 ends the second image forming condition adjustment process. It is noted that the control portion 7 may determine that the skewness acquired in step S26 is 0 (zero) when the acquired skewness is very small.

<Step S28>

In step S28, the control portion 7 adjusts the image forming condition based on the skewness acquired in step S26. Here, the process of step S28 is an example of the adjustment step of the present disclosure, and is executed by the adjustment processing portion 65 of the control portion 7.

Specifically, the control portion 7 determines the unevenness depth level based on the skewness acquired in step S26.

In addition, the control portion 7 consults the first table data TD11 (see FIG. 6) to identify an adjustment amount of the nip pressure at the secondary transfer position P1 corresponding to the determined unevenness depth level. Subsequently, the control portion 7 adjusts the nip pressure at the secondary transfer position P1 based on the identified adjustment amount.

In addition, the control portion 7 consults the second table data TD12 (see FIG. 7) to identify an adjustment amount of the secondary transfer current corresponding to the determined unevenness depth level. Subsequently, the control portion 7 adjusts the secondary transfer current based on the identified adjustment amount.

As described above, in the image forming apparatus 200, the specific toner image that includes: the first toner layer of the first color formed on the intermediate transfer belt 26; and the second toner layer of the second color formed on the first toner layer, is transferred to a sheet. In addition, a skewness of a histogram of gradation values of a color mixture of the second color and the third color is acquired based on the specific image corresponding to the specific toner image included in the captured image of the sheet. Furthermore, the image forming condition is adjusted based on the acquired skewness. With this configuration, when an image is formed on a sheet with an uneven surface, compared with the image forming apparatus of the related technology, it is possible to adjust the image forming condition accurately.

It is noted that the image forming apparatus 200 may acquire a skewness corresponding to the specific image that is included in the captured image of the sheet to which the specific toner image has been transferred, based on the specific image, and acquire the specific value based on pixels of a sheet area included in the captured image that is different from the specific image. In this case, the image forming apparatus 200 may adjust the image forming condition based on both the acquired skewness and the acquired specific value. For example, the image forming apparatus 200 may adjust the image forming condition based on a simple average value or a weighted average value of: an unevenness depth level corresponding to the acquired skewness; and an unevenness depth level corresponding to the acquired specific value. In addition, the image forming apparatus 200 may adjust the image forming condition based on any one of the acquired skewness and the acquired specific value that corresponds to a higher unevenness depth level.

In addition, the image forming apparatus 200 may execute the processes of steps S11 to S15 of the first image forming condition adjustment process, and determine whether or not to execute the second image forming condition adjustment process, based on the specific value acquired by the process of step S15. For example, the image forming apparatus 200 may execute the process of step S16 when the specific value acquired by the process of step S15 exceeds a predetermined threshold, and execute the second image forming condition adjustment process instead of the process of step S16 when the specific value is equal to or smaller than the threshold. In addition, the image forming apparatus 200 may execute the second image forming condition adjustment process instead of the process of step S16 when the specific value acquired by the process of step S15 exceeds the threshold, and execute the process of step S16 when the specific value is equal to or smaller than the threshold. In addition, the image forming apparatus 200 may execute the second image forming condition adjustment process instead of the process of step S16 when the specific value acquired by the process of step S15 exceeds the threshold, and end the first image forming condition adjustment process without executing the process of step S16 when the specific value is equal to or smaller than the threshold.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   an image forming portion configured to form an image on a sheet;
   a first acquisition processing portion configured to acquire a captured image of the sheet;
   a second acquisition processing portion configured to acquire a specific value that indicates a difference between a gradation value of a pixel that, among pixels included in the captured image acquired by the first acquisition processing portion, corresponds to a higher part of an outer surface of the sheet, and a gradation value of a pixel that, among the pixels included in the captured image, corresponds to a lower part that is lower than the higher part; and
   an adjustment processing portion configured to adjust an image forming condition of the image forming portion based on the specific value acquired by the second acquisition processing portion.

2. The image forming apparatus according to claim 1, wherein
   the second acquisition processing portion acquires, as the specific value, a difference between: a gradation value that, in a histogram of gradation values of pixels included in the captured image, corresponds to a local maximum value of a highest frequency; and a gradation value that corresponds to a local maximum value of a second highest frequency.

3. The image forming apparatus according to claim 1, further comprising
   an image capturing portion configured to capture an image of the sheet that is conveyed via an image forming position where an image formation is performed by the image forming portion, wherein
   the first acquisition processing portion acquires the captured image of the sheet by using the image capturing portion.

4. The image forming apparatus according to claim 1, wherein
   the image forming portion includes a transfer portion configured to transfer a toner image to the sheet, and
   the image forming condition includes a transfer condition under which the transfer portion transfers the toner image.

5. The image forming apparatus according to claim 1, wherein
   the image forming portion includes a fixing portion configured to fix the toner image transferred to the sheet, to the sheet, and
   the image forming condition includes a fixing condition under which the fixing portion fixes the toner image.

6. An image forming condition adjustment method executed in an image forming apparatus including an image forming portion configured to form an image on a sheet, the image forming condition adjustment method comprising:
   a first acquisition step of acquiring a captured image of the sheet;
   a second acquisition step of acquiring a specific value that indicates a difference between a gradation value of a pixel that, among pixels included in the captured image acquired in the first acquisition step, corresponds to a higher part of an outer surface of the sheet, and a gradation value of a pixel that, among the pixels included in the captured image, corresponds to a lower part that is lower than the higher part; and
   an adjustment step of adjusting an image forming condition of the image forming portion based on the specific value acquired in the second acquisition step.

* * * * *